United States Patent [19]

Mastromattei

[11] Patent Number: 5,485,410
[45] Date of Patent: Jan. 16, 1996

[54] MEASUREMENT CALCULATOR

[76] Inventor: Tonino Mastromattei, 33 Gateway La., Lynn, Mass. 01905

[21] Appl. No.: 232,631

[22] Filed: Apr. 25, 1994

[51] Int. Cl.⁶ .................................................. G01B 3/08
[52] U.S. Cl. ................ 364/705.01; 364/562; 364/709.07
[58] Field of Search .............................. 364/705.01, 562, 364/709.07

[56] References Cited

U.S. PATENT DOCUMENTS

| | | | |
|---|---|---|---|
| 3,973,113 | 8/1976 | Goldsamt | 364/709.07 |
| 4,181,848 | 1/1980 | Iwase | 364/562 |
| 4,181,959 | 1/1980 | Tateishi | 364/705.01 |
| 4,181,960 | 1/1980 | Tateishi et al. | 364/705.01 |
| 4,195,348 | 3/1980 | Kakutani | 364/705.01 |
| 4,213,035 | 7/1980 | Washizuka et al. | 364/705.01 |
| 5,027,296 | 6/1991 | Yamaguchi et al. | 364/562 |

*Primary Examiner*—David H. Malzahn

[57] ABSTRACT

A measurement calculator for storing and calculating measurement data comprising computer circuitry having central processing unit circuitry adapted for controlling the status of operations of the computer circuitry and manipulating measurement data therein; memory circuitry having a plurality of memory cells adapted for storing instructions and measurement data for use by the central processing unit circuitry with the measurement data accessed by a user with labels denoted by a plurality of alpha-numeric symbols; display circuitry adapted for displaying operational status indications and labels with the associated measurement data; bus circuitry adapted for transferring computer circuitry instructions and measurement data between the central processing unit circuitry, memory circuitry, and display circuitry; keypad circuitry coupled to the central processing unit circuitry having a plurality of keys adapted for inputting measurement data, performing operations on measurement data, controlling memory, processing, and display operations, and accessing measurement data indexed by the labels; computer instructions resident in the memory circuitry adapted for operating with the computer circuitry for manipulating the measurement data; and power circuitry for energizing and deenergizing the computer circuitry.

1 Claim, 4 Drawing Sheets

PRIOR ART

FIG 7

PRIOR ART

MEASUREMENT CALCULATOR

BACKGROUND OF THE INVENTION

1. Field of the Invention

The present invention relates to a measurement calculator and more particularly pertains to storing and calculating measurement data with a measurement calculator.

2. Description of the Prior Art

The use of calculators is known in the prior art. More specifically, calculators heretofore devised and utilized for the purpose of storing and calculating values are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,892,957 to Bryant discloses a digit mask logic combined with sequentially addressed memory in electronic calculator chip. U.S. Pat. No. 4,159,525 to Olander, Jr. et al. discloses a programmable calculator employing computed memory addresses. U.S. Pat. No. 4,821,228 to Wickes et al. discloses method and apparatus for computation stack recovery in a calculator. U.S. Pat. No. 5,130,939 to Yoshino discloses compact electronic calculator capable of displaying matrix element data under actual matrix form. U.S. Pat. No. 5,150,316 to Morita et al. discloses electronic apparatus.

While these devices fulfill their respective, particular objective and requirements, the aforementioned patents do not describe a measurement calculator that allows intuitive input, manipulation, and access of measurement data via customized computer circuitry and computer instructions.

In this respect, the measurement calculator according to the present invention substantially departs from the conventional concepts and designs of the prior art, and in doing so provides an apparatus primarily developed for the purpose of storing and calculating measurement data.

Therefore, it can be appreciated that there exists a continuing need for new and improved measurement calculator which can be used for storing and calculating measurement data. In this regard, the present invention substantially fulfills this need.

SUMMARY OF THE INVENTION

In the view of the foregoing disadvantages inherent in the known types of calculators now present in the prior art, the present invention provides an improved measurement calculator. As such, the general purpose of the present invention, which will be described subsequently in greater detail, is to provide a new and improved measurement calculator and method which has all the advantages of the prior art and none of the disadvantages.

To attain this, the present invention essentially comprises, in combination, a hollow housing adapted to be coupled to the side of a tape measure; computer circuitry disposed within and extended from the housing, the computer circuitry further comprising central processing unit circuitry adapted for controlling the status of operations of the computer circuitry and manipulating measurement data therein; read-only-memory circuitry having a plurality of memory cells adapted for storing non-volatile instructions and data for use by the central processing unit circuitry; random-access-memory circuitry having a plurality of memory cells adapted for storing user-supplied volatile measurement data with a single item of measurement data being logically accessed by a user with a label denoted by a single alphabetic symbol from 'a' through 'z'; gate circuitry coupled to the read-only-memory circuitry and random-access-memory circuitry and adapted for selecting volatile and non-volatile instructions and data therefrom for processing and display; liquid crystal display circuitry adapted for displaying measurement data and operational status indications, the liquid crystal display circuitry having a display window with a status section and a memory cell content section, the status section displaying error status, arithmetic operation in-progress status, and an indication of fractional processing in-progress status, the memory cell content section displaying a label with the associated numeric measurement data, fractional measurement data, and unit of measure; driver circuitry coupled between the central processing unit circuitry and liquid crystal display circuitry adapted for converting measurement data and operational status indications to a form compatible for display by the liquid crystal display circuitry; bus circuitry adapted for transferring computer circuitry instructions and data between the central processing unit circuitry, read-only-memory circuitry, random-access-memory circuitry, gate circuitry, and driver circuitry; keypad circuitry coupled to the central processing unit circuitry and adapted for receiving user input measurement data and instructions for use, the keypad circuitry having numeric keys adapted for inputting numeric measurement data, fraction keys adapted for inputting fractional measurement data, arithmetic operation keys adapted for performing operations on measurement data, unit-of-measurement keys adapted for converting measurement data having an existing unit of measure to another unit of measure, memory operation keys adapted for controlling memory, processing and display operations, and scrolling keys adapted for accessing and scrolling through measurement data indexed by the labels; computer instructions resident in the read-only memory circuitry adapted for operating with the computer circuitry for manipulating measurement data; power circuitry for energizing the computer circuitry; and switch means coupled between the power circuitry and computer circuitry and having one orientation for activating the computer circuitry and another orientation for de-activating the computer circuitry.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved measurement calculator which has all the advantages of the prior art calculators and none of the disadvantages.

It is another object of the present invention to provide a new and improved measurement calculator which may be easily and efficiently manufactured and marketed.

It is a further object of the present invention to provide a new and improved measurement calculator which is of durable and reliable construction.

An even further object of the present invention is to provide a new and improved measurement calculator which is susceptible of a low cost of manufacture with regard to both materials and labor, and which accordingly is then susceptible of low prices of sale to the consuming public, thereby making such a measurement calculator economically available to the buying public.

Still yet another object of the present invention is to provide a new and improved measurement calculator which provides in the apparatuses and methods of the prior art some of the advantages thereof, while simultaneously overcoming some of the disadvantages normally associated therewith.

Even still another object of the present invention is to provide a new and improved measurement calculator for storing and calculating measurement data.

Lastly, it is an object of the present invention to provide a new and improved measurement calculator comprising computer circuitry having central processing unit circuitry adapted for controlling the status of operations of the computer circuitry and manipulating measurement data therein; memory circuitry having a plurality of memory cells adapted for storing instructions and measurement data for use by the central processing unit circuitry with the measurement data accessed by a user with labels denoted by a plurality of alpha-numeric symbols; display circuitry adapted for displaying operational status indications and labels with the associated measurement data; bus circuitry adapted for transferring computer circuitry instructions and measurement data between the central processing unit circuitry, memory circuitry, and display circuitry; keypad circuitry coupled to the central processing unit circuitry having a plurality of keys adapted for inputting measurement data, performing operations on measurement data, controlling memory, processing, and display operations, and accessing measurement data indexed by the labels; computer instructions resident in the memory circuitry adapted for operating with the computer circuitry for manipulating the measurement data; and power circuitry for energizing and de-energizing the computer circuitry.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figures 1, 2:
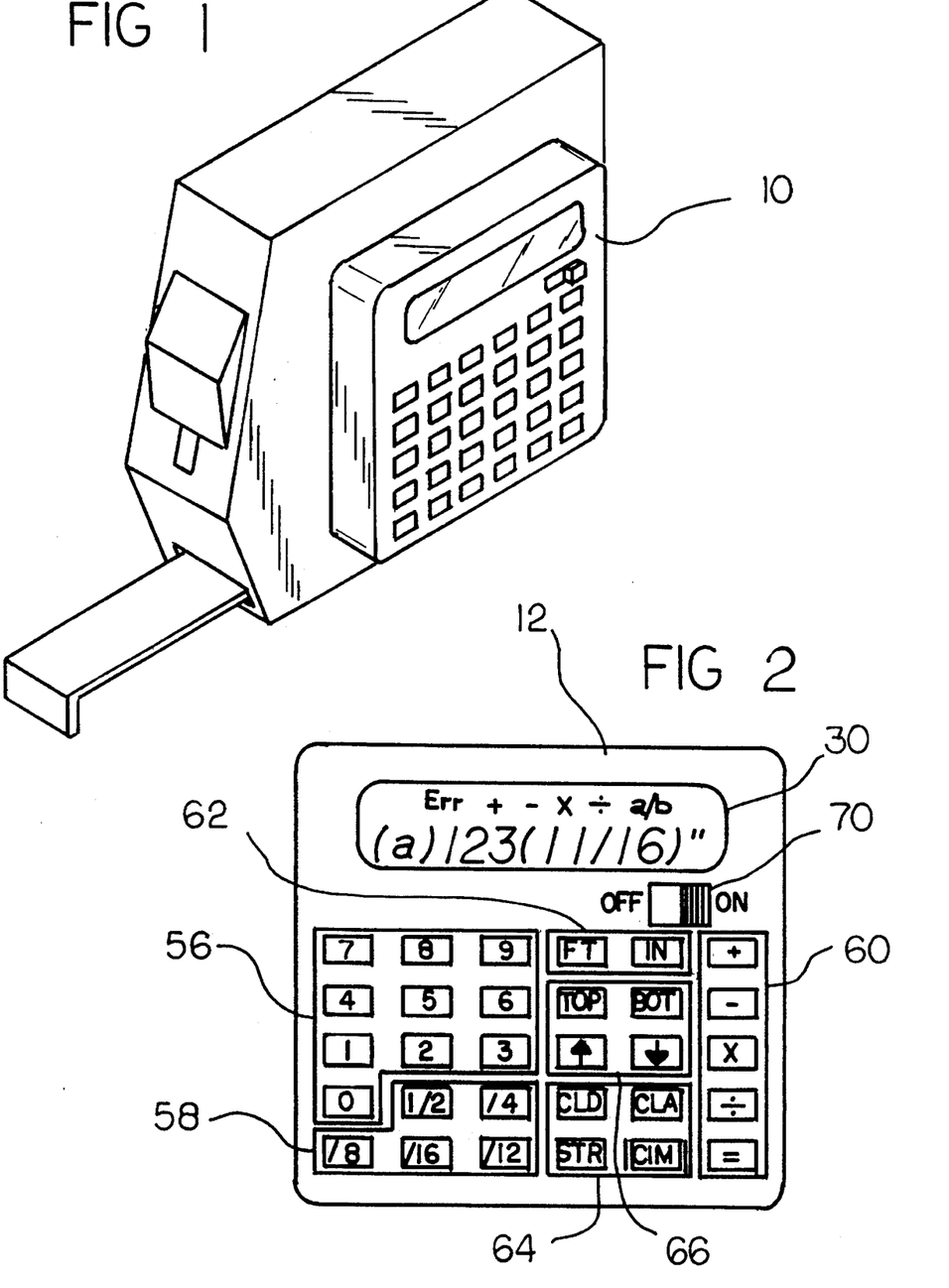
FIG. 1 is a perspective view of the preferred embodiment of the measurement calculator constructed in accordance with the principles of the present invention.
FIG. 2 is a plan view of the present invention shown in FIG. 1.

With reference now to the drawings, and in particular, to FIG. 1 thereof, the preferred embodiment of the new and improved measurement calculator embodying the principles and concepts of the present invention and generally designated by the reference number 10 will be described.

The present invention includes five major components. The major components are the housing, the computer circuitry, computer instructions, the power circuitry, and the switch means. These components are interrelated to provide the intended function.

Specifically, it will be noted in the various Figures that the first major component is the housing 12. The housing is rigid and essentially rectangular in structure. It is adapted to be coupled to the side of a tape measure.

The second major component is the computer circuitry. The computer circuitry is disposed within and extended from the housing 12. The computer circuitry includes eight subcomponents. These subcomponents are interrelated to provide the intended function.

Figure 4:
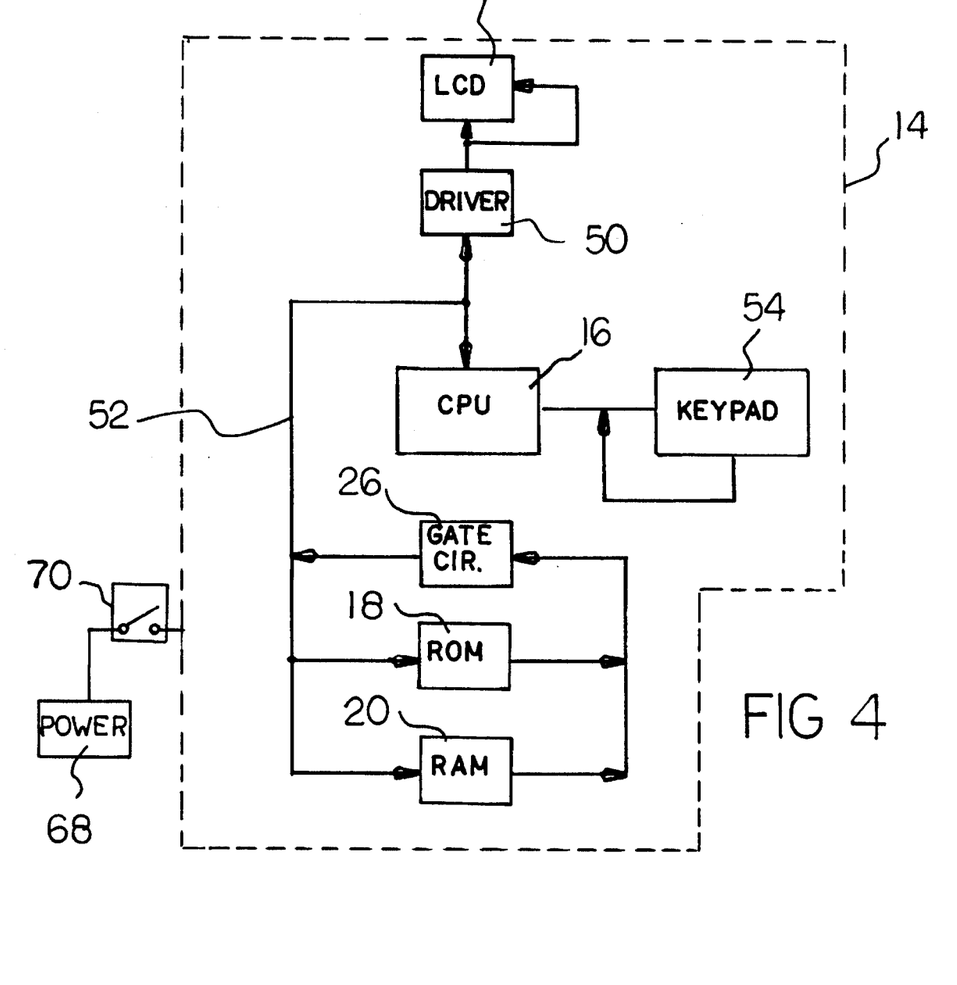
FIG. 4 is a functional block diagram of the circuitry of the present invention.

The first subcomponent is the central processing unit circuitry 16. The central processing unit circuitry is adapted for controlling the status of operations of the computer. The central processing unit circuitry is also adapted for manipulating measurement data therein.

The second subcomponent is the read-only-memory circuitry 18. The read-only-memory circuitry has a plurality of memory cells therein. The read-only-memory circuitry is adapted for storing non-volatile instructions and data for use by the central processing unit circuitry 16.

Figure 5:
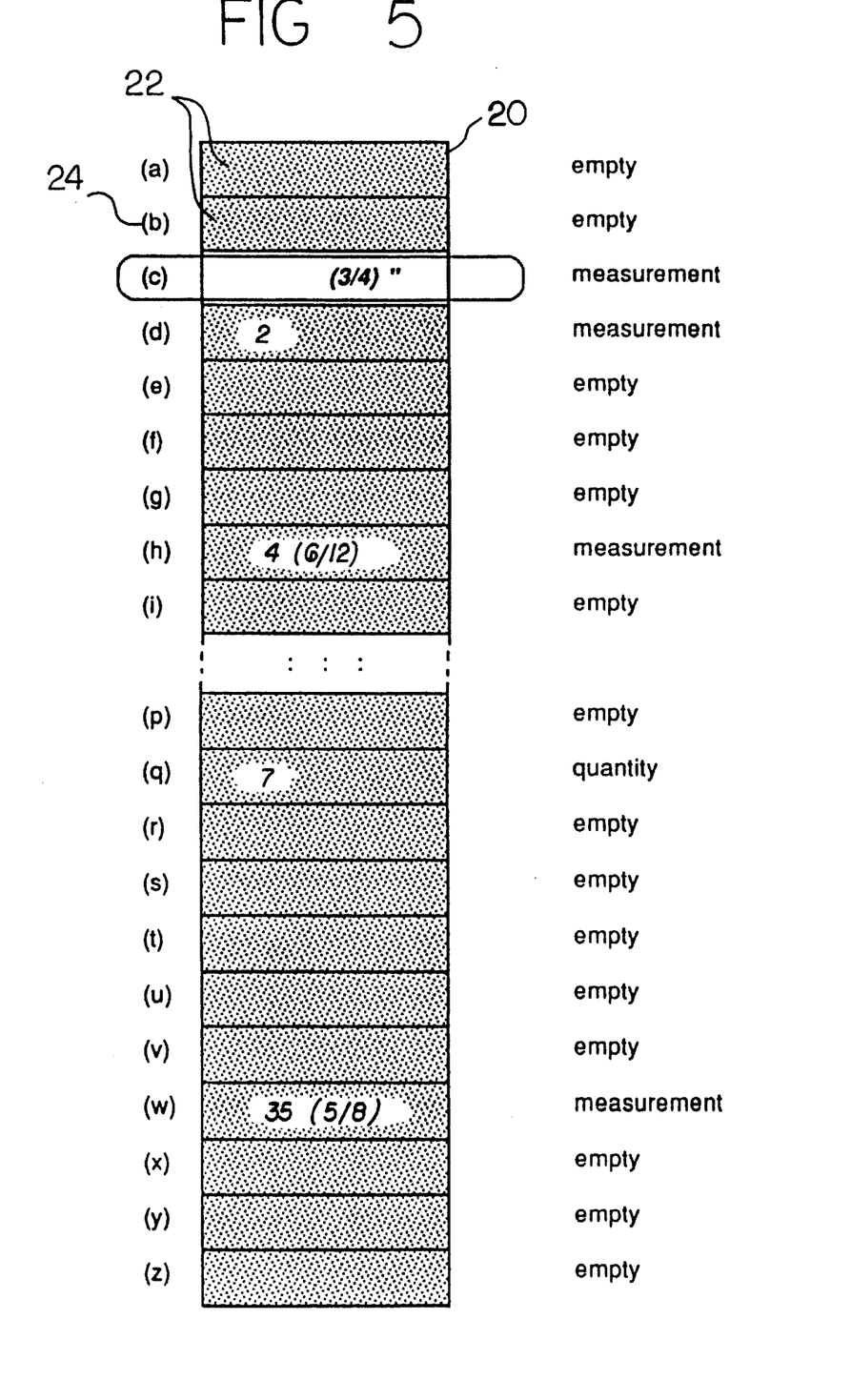
FIG. 5 depicts a portion of a logical memory map contained in the memory circuitry for indexing and accessing measurement values with alphabetic labels input via the keyboard circuitry.
Figure 6:
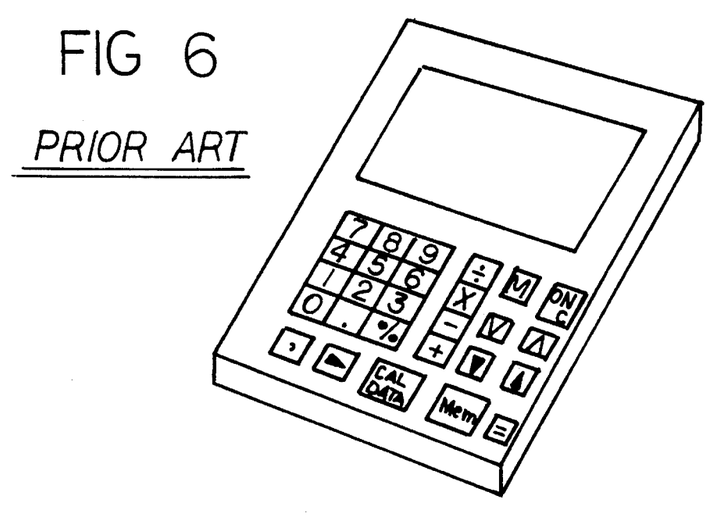
FIG. 6 illustrates a prior art calculating device.
Figure 7:
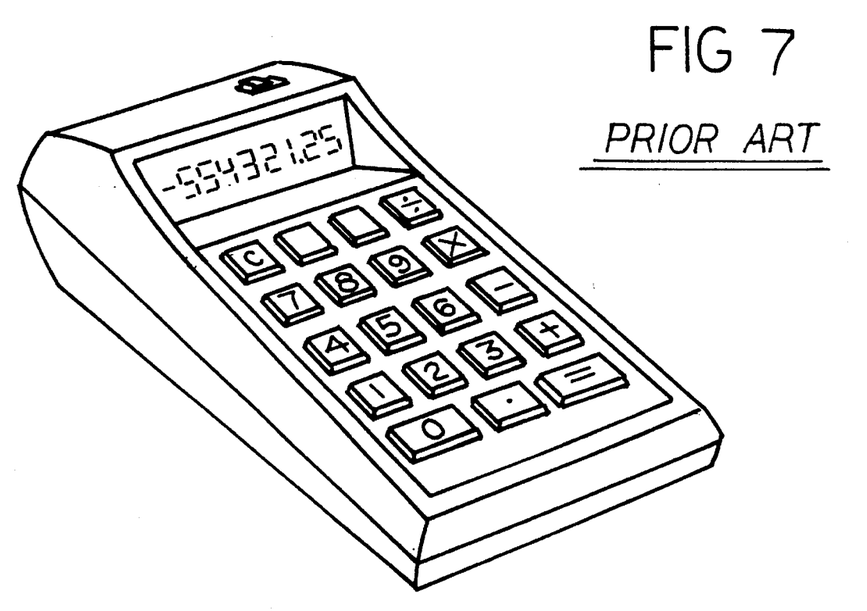
FIG. 7 is another prior art electronic device.

The third subcomponent is the random-access-memory circuitry 20. The random-access-memory circuitry has a plurality of memory cells 22 adapted for storing user-supplied volatile measurement data. A single item of measurement data is logically accessed by a user with a label 24 denoted by a single alphabetic symbol from 'a' through 'z'.

The fourth subcomponent is the gate circuitry 26. The gate circuitry is coupled to the read-only-memory circuitry 18 and the random-access-memory circuitry 20. The gate circuitry is adapted for selecting volatile and non-volatile instructions and data from the read-only-memory circuitry and the random-access-memory circuitry for processing and display.

Figure 3:
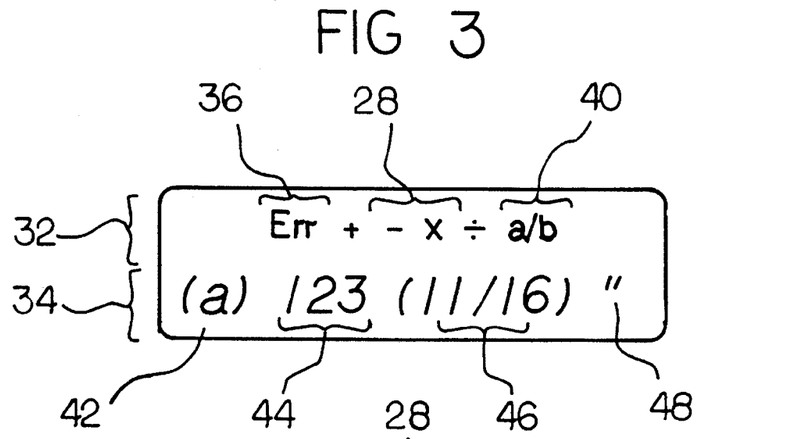
FIG. 3 is an enlarged view of the display window of the present invention.

The fifth subcomponent is the liquid crystal display circuitry 28. The liquid crystal display circuitry is adapted for displaying measurement data and operational status indications. The liquid crystal display circuitry has a display window 30 with a status section 32 and a memory content section 34. The status section displays error status 36, arithmetic operation in progress status 38, and an indication of fractional processing in progress status 40. The memory cell content section displays a label 42 with the associated numeric measurement data 44, fractional measurement data 46, and unit of measure 48. The label 42 displayed on the display is directly correlated with the label 24 for accessing measurement data values in the random-access-memory circuitry.

The sixth subcomponent is the driver circuitry 50. The driver circuitry is coupled between the central processing unit circuitry 16 and the liquid crystal display circuitry 28. The driver circuitry is adapted for converting measurement data and operational status indications to a form compatible for display by the liquid crystal display circuitry.

The seventh subcomponent is the bus circuitry 52. The bus circuitry is adapted for transferring computer circuitry instructions and data. The bus circuitry is coupled between the central processing unit circuitry 16, read-only-memory circuitry 18, random-access-memory circuitry 20, gate circuitry 26, and driver circuitry 50.

The eighth subcomponent is the keypad circuitry 54. The keypad circuitry is coupled to the central processing unit circuitry 16 and adapted for receiving user input measurement data and instructions for use. The keypad circuitry has numeric keys 56 adapted for inputting numeric measurement data, fraction keys 58 adapted for inputting fractional measurement data and arithmetic operation keys 60 adapted for performing operations on measurement data. The keypad circuitry also includes unit of measurement keys 62 adapted for converting measurement data having an existing unit of measure to another unit of measure, memory operation keys 64 adapted for controlling memory, processing, and display operations, and scrolling keys 66 adapted for accessing and scrolling through measurement data indexed by the labels 42.

The third major component is the power circuitry 68. The power circuitry is coupled to the computer circuitry. It is used to energize the computer circuitry.

The fifth major component is the computer instructions (TABLE 2). The computer instructions are resident in the read-only-memory circuitry. The computer instructions control the computer circuitry and operate in conjunction therewith to manipulate the measurement data.

The fourth major component is the switch means 70. The switch means are coupled between the power circuitry 68 and the computer circuitry 14. The switch means has one orientation for activating the computer circuitry and another orientation for deactivating the computer circuitry.

More specifically, the purpose of the present invention is to provide a special purpose calculator referred to be used in conjunction with a conventional tape measure, or any other type of measuring tool. To completely understand why such a device would be convenient, a closer look at measuring is needed. When measurements are used for a task, the completion of the task becomes an iterative process between taking a measurement and then taking an action based on that measurement (or measurements), then taking another measurement and another action and so on. Other common practices are to write down lists of measurements for use later on when needed and to perform simple arithmetic with measurements.

The function of the present invention is to perform the basic operations that come natural to anyone using a measuring tool, these operations consist of storing, reviewing, labeling, converting and performing arithmetic on measurements. The measurement calculator would yield savings in time by eliminating continuous memorizations of measurements, allowing the user to store groups of labeled measurements at a time. Human error is eliminated by providing accurate results in arithmetic and the unnecessary scribbling of measurements.

Most calculators are designed to accommodate the entry of calculations and to provide a memory store/recall capability to hold a single numeric value. Alternatively, the present invention is designed to allow the entry of numeric values into a list of labeled memory cells; calculations can then be acted upon them while reviewing the list. This design approach is quite similar to an electronic spreadsheet (with one column), where values can be stored, reviewed and processed. Coincidentally, the present invention operates like a conventional calculator when only one memory cell is used.

In the preferred embodiment, the functional layout of the present invention is shown in FIG. 1 and FIG. 2. Physically, the form intended for the present invention is to have the it integrated with a tape measure's side casing as one unit or mounted on the side of a conventional tape measure. An alternate embodiment of the present invention is a hand held unit, similar to a typical calculator. Note, when considering tape measures, only sizes of 20 feet or greater provide enough clearance for the present invention, which in turn allows proper clearance for the placement of keys.

The display window on the display circuitry is comprised of two sections—the status and memory cell content sections—as shown in FIG. 3. Each section is broken down into fields to show different pieces of information relevant to that section. The status section displays information on the status of the present invention while in operation, its fields indicate:

1. Error

2. Which arithmetic operation is in progress and

3. When a fraction entry is in progress

The memory cell content section displays the value in the current memory cell indicated by the label field. Fields that make up this section include:

1. Label

2. Numeric

3. Fraction and

4. Unit of measurement.

Together these fields can indicate one of three types of values:

1. Empty memory cell

2. Quantity value, or

3. Measurement value.

An empty memory cell is when every field, except the label field of the current cell is empty (the label field is never empty). Quantity or measurement values are distinguished by whether the unit of measurement does not exist or exists, respectively.

Quantity or measurement data get entered into memory cells which are indexed by single letters 'a' through 'z' referred to as labels. There are a total of 26 labels available. In addition to showing which memory cell is current, the labels can also be used as a way of identifying what the value entered is. Memory representation is illustrated in FIG. 5, with example values that show a [q]uantity of 7 cabinets, using ¾ inch [c]onstruction, 2 feet [d]epth, 35⅝ inches [w]idth and 4½ feet [h]eight ([ ]denotes a label). The display window can scroll up and down the memory list displaying one memory cell at a time.

A memory cell is recognized as stored or unstored. A stored memory cell has a value content which can not be updated until the display is cleared (cld). An unstored memory cell indicated its empty but can contain an unstored value that only exists for the time it appears; it becomes stored when depressing the store key (str). The unstored value could also appear at a stored memory cell, with the stored value hidden until the store key is depressed. This occurs when converting the unit of measurement (ft',in") of a stored memory cell; the converted value is an unstored value until it is stored explicitly, or else the original value is retained.

The keys are grouped in the following manner (Note, each key is described in detail in the finite state machine report in Table 2):

1. Numeric: (0..9) These keys represent the basic numeric keys to enter measurements, quantities and fractions.

2. Fractional: (½ . . . ⅙, /12) These keys represent fractions; keys ½ . . . /16 are the means of entering fractions of an inch. Once depressed the present invention enters a mode of enabling the full fraction to be entered, for example; if the desired fraction is ¾", the user can enter /4 and then the numeric 3. Key /12 allows entering fractions of a foot to be associated with feet measurements. These fractions represent inches, for example; if the desired measurement is 5½', the user can enter 5, then ½ and then 6 (5 feet and 6 inches).

3. Conversion: (ft',in") These keys perform two functions; the first is to establish that a value is a measurement by setting the unit of measurement for that value. The second function is to convert an existing measurement to a different unit of measurement.

4. Scrolling: (top, bot, ^, v) These keys allow the range of memory to be viewed through the display window one memory cell at a time.

5. Memory: (cld, clm, str) These keys perform operations on memory; cld clears the current display and the memory cell associated with it, clm clears all of memory and str stores the current value displayed to the memory cell indicated by the label field.

6. Arithmetic: (cla-clear arithmetic in progress-, +,−,x, <div>,=) These keys allow arithmetic with the values available in the memory cells. Arithmetic on the present invention is a bit different than on typical calculators in that, while the calculation is being entered its result is getting accumulated but not shown until the=key is entered. The main difference however, is that values for a given calculation can be selected from memory with the intended arithmetic function (+, −,x,< div>,=). Values can also be entered at the time of the calculation into an unstored memory cell. Once the result is to be shown, the present invention finds an empty memory cell to display the result. This result can then also be further manipulated as a memory cell value; for example, if memory cells a and b both have stored values that are to be added together, the user scrolls to memory cell a, depressed the+key, scrolls to memory cell b and depresses the=key, the result if legal appears in an empty memory cell. Arithmetic is validated and the error status field will appear as a result of any overflow, negative values, division by zero or bad conversions between measurements and quantity. The conversion rules are indicated in TABLE 1; for example, a measurement multiplied by a quantity yields a measurement as shown in the first row, seventh column:

TABLE 1

ARITHMETIC CONVERSION TABLE
m: Measurement value
q: Quantity value

|   | xm | −m | xm | <div>m | +q | −q | xq | <div>q |
|---|----|----|----|--------|----|----|----|----|
| m | m  | m  | Error | q   | Error | Error | m | m |
| q | Error | Error | Error | Error | q | q | q | q |

7. Operational: To show the actual operation of the present invention in detail, a finite state machine is provided in TABLE 2. This machine allows one to fully understand and visualize the actions taken and different states entered by the present invention as a function of keys being depressed. The actions taken are step by step statements about the required processing the present invention will need to perform. The keys are regarded as the stimuli to this finite state machine. The state machine is implemented in the computer circuitry and computer instructions resident in the read-only-memory of the computer circuitry.

TABLE 2

FINITE STATE MACHINE REPORT
(with Structured English Actions)

Comments:

AACC: Arithmetic Accumulator
- Stores the accumulation of an arithmetic operation in progress.
AREG: Arithmetic Operator Register
- Stores the last arithmetic operator of an arithmetic operation in progress.
NTOK: New Token Indicator
- Indicates when the value segment part of the display needs clearing for the start of a new value to be entered.

TABLE 2-continued

FINITE STATE MACHINE REPORT
(with Structured English Actions)

FLMT: Fraction Limit
    - Indicates the maximum numeric entry to
    complete a given fraction.

| State | Stimulus | Action |
|---|---|---|
| Powered off | Switch on | Display first memory cell. Clear status display. Clear AREG. Clear AACC. Clear NTOK. Clear FLMT. Enter state Numeric. |
|  | Other | None. Enter state Powered off. |
| Powering off | Switch off | Entire display cleared. Current unstored value if present, is lost. Stored memory cells retained. Enter state Powered off. |
| Numeric | 0 . . . 9 | If the current memory cell is stored   Search for an unstored memory cell in a     forward direction starting at the   current cell, wraparound if necessary.   If found     Display the new current memory cell.   else     Display status field 'Err'.     Enter state Error.   endif. else (unstored)   If NTOK is set     Clear NTOK     If a value is present       Clear numeric, fraction and unit of         measurement field.     endif.   endif. endif. If the number of numeric values displayed   in the numeric field is <3   Display the numeric value in the numeric     field, right justified. else   Ignore the entry. endif. Enter state Numeric. |
|  | ½, /16, /12 | If the current memory cell is stored   Search for an unstored memory cell in a     forward direction starting at the     current cell, wraparound if     necessary.   If found     Display the new current memory cell.   else     Display status field 'Err'.     Enter state Error.   endif else (unstored)   If NTOK is set     Clear NTOK     If a value is present       Clear numeric, fraction and unit of         measurement field.     endif.   endif. endif. Establish current memory cell as a   measurement. Case of entry: ½: Display ½ in the fraction field.   Display " in the unit of     measurement field.   Enter state Numeric. /4: Display /4 in the fraction field.   Display " in the unit of     measurement field.   Set FLMT to 3. |

TABLE 2-continued

FINITE STATE MACHINE REPORT
(with Structured English Actions)

|  |  |
|---|---|
| | /8: Display /8 in the fraction field. |
| |    Display " in the unit of |
| |      measurement field. |
| |    Set FLMT to 7. |
| | /16: Display /16 in the fraction field. |
| |    Display " in the unit of |
| |      measurement field. |
| |    Set FLMT to 9. |
| | /12: Display /12 in the fraction field. |
| |    Display ' in the unit of |
| |      measurement field. |
| | endcase |
| | Display status field 'a/b' |
| | Enter state Fraction. |
| ft', in" | If the current memory cell is a measurement |
| |   If the unit of measurement displayed is the same |
| |     Remove ' or " accordingly and fraction if present. |
| |     If numeric field contains a value |
| |       Establish current memory cell as a quantity. |
| |     else |
| |       Establish current memory cell as empty. |
| |     endif. |
| |   else (different) |
| |     Convert the measurement to the unit of measurement entered. |
| |     If the conversion is legal |
| |       Display the converted value. |
| |       Set NTOK. |
| |     else |
| |       Display status field 'Err'. |
| |       Enter state Error. |
| |     endif. |
| | endif. |
| else if a quantity | |
| |   Display the entry in the unit of measurement field. |
| |   Establish the memory cell as a measurement. |
| | else if empty |
| |   Ignore the entry. |
| | endif. |
| | Enter state Numeric. |
| top, bot | Current unstored value if present is lost. |
| | Display first or last memory cell accordingly. |
| | Enter state Numeric. |
| ^, v | Current unstored value if present is lost. |
| | Display previous or next memory cell. |
| | Wrap-around if necessary. |
| | Enter state Numeric. |
| cld | Clear numeric, fraction and unit of measurement field of the current memory cell. |
| | Establish the current memory cell as empty/unstored. |
| | Clear NTOK. |
| | Enter state Numeric. |
| cla | If the AREG contains an operator (arithmetic in progress) |
| |   Clear AREG. |
| |   Clear AACC. |
| |   Clear the appropriate arithmetic field '+', '−', 'x', '<div>'. |
| | endif. |
| | Enter state Numeric. |
| clm | Clear numeric, fraction and unit of measurement field of every memory cell. |
| | Establish every memory cell as empty/unstored. |
| | Display the first memory cell. |
| | Clear NTOK. |

TABLE 2-continued

FINITE STATE MACHINE REPORT
(with Structured English Actions)

|  |  |
|---|---|
|  | Enter state Numeric. |
| str | If a value is present at the current memory cell |
|  |   Establish the current value of the current memory cell as stored. |
|  |   Search for an unstored memory cell in a forward direction starting at the current cell, wraparound if necessary. |
|  |   If found |
|  |     Display the new current memory cell. |
|  |   endif. |
|  |   Clear NTOK. |
|  | else (no value present) |
|  |   Display status field 'Err'. |
|  |   Enter state Error. |
|  | endif. |
|  | Enter state Numeric. |
| +, −, x, \<did\> | If the current memory cell is empty (no value present) |
|  |   If the AREG contains an operator |
|  |     Clear AREG. |
|  |     Clear AACC. |
|  |     Clear the appropriate arithmetic status field '+', '−', 'x', '\<div\>'. |
|  |   endif. |
|  |   Display status field 'Err'. |
|  |   Enter state Error. |
|  | else (stored or unstored value present) |
|  |   If the AREG contains no operator |
|  |     Set the AREG to the entry (+, −, x, \<div\>) |
|  |     Set the AACC to the current memory cell value. |
|  |     Display appropriate status field '+', '−', 'x', '\<div\>'. |
|  |     Set NTOK. |
|  |     Enter state Numeric. |
|  |   else (arithmetic in progress, continue) |
|  |     (Perform the arithmetic operation using AACC, AREG and current memory cell value) |
|  |     Validate operands and operator against the Arithmetic Conversion Table. |
|  |     If both operands and operator are valid |
|  |       Set AACC to |
|  |         \<AACC\> \<AREG\> \<current memory cell value\>. |
|  |       If the resultant value is legal |
|  |         Set the AREG to the entry (+, − x, \<div\>). |
|  |         Display appropriate status field '+', 'x', '\<div\>'. |
|  |         Set NTOK. |
|  |         Enter state Numeric. |
|  |       endif. (resultant value) |
|  |     endif. (validity of operands and operator) |
|  |     Clear AREG. |
|  |     Clear AACC. |
|  |     Clear the appropriate arithmetic status field '+', '−', 'x', '\<div\>'. |
|  |     Display status field 'Err'. |
|  |     Enter state Error. |
|  |   endif. (AREG) |
|  | endif. (current memory cell) |
| = | If the current memory cell is empty (no value present) |
|  |   If the AREG contains an operator |
|  |     Clear AREG. |
|  |     Clear AACC. |
|  |     Clear the appropriate arithmetic status field '+', '−', 'x', '\<div\>'. |
|  |   endif. |
|  |   Display status field 'Err'. |
|  |   Enter state Error. |
|  | else (stored or unstored value present) |
|  |   If the AREG contains no operator |

TABLE 2-continued

FINITE STATE MACHINE REPORT
(with Structured English Actions)

|  |  |  |
|---|---|---|
|  |  | (Ignore the current value) |
|  |  | Set NTOK. |
|  |  | Enter state Numeric. |
|  |  | else (arithmetic in progress, continue) |
|  |  | (Perform the arithmetic operation using |
|  |  |   AACC, AREG and current memory cell |
|  |  |   value) |
|  |  | Validate operands and operator against |
|  |  |   the Arithmetic Conversion Table. |
|  |  | If both operands and operator are valid |
|  |  |   Set AACC to |
|  |  |     <AACC> <AREG> <current memory cell |
|  |  |     value>. |
|  |  |   If the resultant value is legal |
|  |  |     Search for an unstored memory cell |
|  |  |       in a forward direction starting |
|  |  |       at the current cell, wraparound |
|  |  |       if necessary. |
|  |  |     If found |
|  |  |       Display the new current memory |
|  |  |         cell with the value in AACC |
|  |  |         (unstored). |
|  |  |       Clear AACC. |
|  |  |       Clear AREG. |
|  |  |       Clear appropriate status field |
|  |  |         '+', '−', 'x', '<div>'. |
|  |  |       Set NTOK. |
|  |  |       Enter state Numeric. |
|  |  |     endif. (found) |
|  |  |   endif. (resultant value) |
|  |  | endif. (validity of operands and |
|  |  |   operator) |
|  |  | Clear AREG. |
|  |  | Clear AACC. |
|  |  | Clear the appropriate arithmetic status |
|  |  |   field '+', '−', 'x', '<div>'. |
|  |  | Display status field 'Err'. |
|  |  | Enter state Error. |
|  |  | endif. (AREG) |
|  |  | endif. (current memory cell) |
| Fraction | 0 . . . 9 | If numeric entry for the fraction field |
|  |  | <=FLMT and >0 |
|  |  | Display the entry in the fraction field, |
|  |  |   right justified. |
|  |  | If FLMT = 9 and entry = 1 |
|  |  |   (Note, if the next desired state is |
|  |  |     Numeric and the desired fraction is |
|  |  |     $\frac{1}{16}$ or $\frac{1}{12}$, depress the same |
|  |  |     fraction displayed:/16 or /12 |
|  |  |     respectively. If a two digit number |
|  |  |     is desired, enter next digit.) |
|  |  |   Case of current fraction: |
|  |  |     /12: Set FLMT to 1. |
|  |  |     /16: Set FLMT to 5. |
|  |  |   endcase. |
|  |  | else |
|  |  |   Enter state Numeric. |
|  |  | endif. |
|  |  | else |
|  |  |   Ignore the entry. |
|  |  | endif . |
|  |  | Enter state Fraction. |
|  | ½, /16/12 | If the entry is the same as the current |
|  |  |   fraction |
|  |  |   If the fraction is not complete |
|  |  |     Remove the fraction and ' or " |
|  |  |       accordingly. |
|  |  |     If the numeric field contains a value |
|  |  |       Establish current memory cell as a |
|  |  |         quantity. |
|  |  |     else |
|  |  |       Establish current memory cell as |
|  |  |         empty. |
|  |  |     endif. |
|  |  |   endif. |
|  |  |   Clear status field 'a/b'. |

TABLE 2-continued

FINITE STATE MACHINE REPORT
(with Structured English Actions)

|  |  |
|---|---|
| | Enter state Numeric. |
| | else (different) |
| | Case of entry: |
| | ½: Display ½ in the fraction |
| | field. |
| | Display " in the unit of |
| | measurement field. |
| | Enter state Numeric. |
| | /4: Display /4 in the fraction field. |
| | Display " in the unit of |
| | measurement field. |
| | Set FLMT to 3. |
| | /8: Display /8 in the fraction field. |
| | Display " in the unit of |
| | measurement field. |
| | Set FLMT to 7. |
| | /16: Display /16 in the fraction |
| | field. |
| | Display " in the unit of |
| | measurement field. |
| | Set FLMT to 9. |
| | /12: Display /12 in the fraction |
| | field. |
| | Display ' in the unit of |
| | measurement field. |
| | Set FLMT to 9. |
| | endcase |
| | Enter state Fraction. |
| | endif. |
| ft', in" | Clear status field 'a/b'. |
| | If the unit of measurement displayed is |
| | the same |
| | Remove fraction and ' or " accordingly. |
| | If the numeric field contains a value |
| | Establish current memory cell as a |
| | quantity. |
| | else |
| | Establish current memory cell as empty. |
| | endif . |
| | else (different) |
| | If the fraction is complete |
| | Convert the measurement to the unit of |
| | measurement entered. |
| | If the conversion is legal |
| | Display the converted value. |
| | Set NTOK. |
| | else |
| | Display status field 'Err'. |
| | Enter state Error. |
| | endif. |
| | else (incomplete) |
| | Remove fraction and ' or " accordingly. |
| | If the numeric field contains a value |
| | Establish current memory cell as a |
| | quantity. |
| | else |
| | Establish current memory cell as |
| | empty. |
| | endif. |
| | Display status field 'Err'. |
| | Enter state Error. |
| | endif. |
| | endif. |
| | Enter state Numeric. |
| top, bot | Current unstored value if present is lost. |
| | Clear status field 'a/b'. |
| | Display first or last memory cell |
| | accordingly. |
| | Enter state Numeric. |
| ^, v | Current unstored value if present is lost. |
| | Clear status field 'a/b'. |
| | Display previous or next memory cell. |
| | Wrap-around if necessary. |
| | Enter state Numeric. |
| cld | Clear status field 'a/b'. |
| | Clear numeric, fraction and unit of |

TABLE 2-continued

FINITE STATE MACHINE REPORT
(with Structured English Actions)

|  |  |
|---|---|
|  | measurement field of the current memory cell. |
|  | Establish the current memory cell as empty/unstored. |
|  | Clear NTOK. |
|  | Enter state Numeric. |
| cla | If the AREG contains an operator (arithmetic in progress) |
|  |   Clear AREG. |
|  |   Clear AACC. |
|  |   Clear the appropriate arithmetic status field '+', '−', 'x', '<div>'. |
|  | endif. |
|  | Enter state Fraction. |
| clm | Clear status field 'a/b'. |
|  | Clear numeric, fraction and unit of measurement field of every memory cell. |
|  | Establish every memory cell as empty/unstored. |
|  | Display the first memory cell. |
|  | Clear NTOK. |
|  | Enter state Numeric. |
| str | Clear status field 'a/b'. |
|  | If the fraction is complete |
|  |   Establish the current value of the current memory cell as stored. |
|  |   Search for an unstored memory cell in a forward direction starting at the current cell, wraparound if necessary. |
|  |   If found |
|  |     Display the new current memory cell. |
|  |   endif. |
|  |   Clear NTOK> |
|  | else |
|  |   Display status field 'Err'. |
|  |   Enter state Error. |
|  | endif. |
|  | Enter state Numeric. |
| +, −, <div> | Clear status field 'a/b'. |
|  | If the current fraction is incomplete |
|  |   If the AREG contains an operator |
|  |     Clear AREG. |
|  |     Clear AACC. |
|  |     Clear the appropriate arithmetic status field '+', '−', 'x', '<div>'. |
|  |   endif. |
|  |   Display status field 'Err'. |
|  |   Enter state Error. |
|  | else (complete fraction) |
|  |   If the AREG contains no operator |
|  |     Set the AREG to the entry (+, −, x, <div>) |
|  |     Set the AACC to the current memory cell value. |
|  |     Display appropriate status field '+', '−', 'x', '<div>'. |
|  |     Set NTOK. |
|  |     Enter state Numeric. |
|  |   else (arithmetic in progress, continue) |
|  |     (Perform the arithmetic operation using AACC, AREG and current memory cell value) |
|  |     Validate operands and operator against the Arithmetic Conversion Table. |
|  |     If both operands and operator are valid |
|  |       Set AACC to |
|  |         <AACC> <AREG> <current memory cell value>. |
|  |       If the resultant value is legal |
|  |         Set the AREG to the entry (+, −, x, <div>). |
|  |         Display appropriate status field '+', '−', 'x', '<div>'. |
|  |         Set NTOK. |
|  |         Enter state Numeric. |
|  |       endif. (resultant value) |
|  |     endif. (validity of operands and |

TABLE 2-continued

FINITE STATE MACHINE REPORT
(with Structured English Actions)

|  |  |  |
|---|---|---|
|  |  | operator)<br>Clear AREG.<br>Clear AACC.<br>Clear the appropriate arithmetic status<br>  field '+', '−', 'x', '<div>'.<br>Display status field 'Err'.<br>Enter state Error.<br>endif.<br>endif. (current memory cell) |
|  | = | Clear status field 'a/b'.<br>If the current fraction is incomplete<br>  If the AREG contains an operator<br>    Clear AREG.<br>    Clear AACC.<br>    Clear the appropriate arithmetic status<br>      field '+', '−', 'x', '<div>'.<br>  endif.<br>  Display status field 'Err'.<br>  Enter state Error.<br>else (complete fraction)<br>  If the AREG contains no operator<br>    (Ignore the current value)<br>    Set NTOK.<br>    Enter state Numeric.<br>  else (arithmetic in progress, continue)<br>    (Perform the arithmetic operation using<br>      AACC, AREG and current memory cell<br>      value)<br>    Validate operands and operator against<br>      the Arithmetic Conversion Table.<br>    If both operands and operator are valid<br>      Set AACC to<br>        <AACC> <AREG> <current memory cell<br>        value>.<br>      If the resultant value is legal<br>        Search for an unstored memory cell<br>          in a forward direction starting<br>          at the current cell, wraparound<br>          if necessary.<br>        If found<br>          Display the new current memory<br>            cell with the value in AACC<br>            (unstored).<br>          Clear AACC.<br>          Clear AREG.<br>          Clear appropriate status field<br>            '+', '−', 'x', '<div>'.<br>          Set NTOK.<br>          Enter state Numeric.<br>        endif. (found)<br>      endif. (resultant value)<br>    endif. (validity of operands and<br>      operator)<br>    Clear AREG.<br>    Clear AACC.<br>    Clear the appropriate arithmetic status<br>      field '+', '−', 'x', '<div>'.<br>    Display status field 'Err'.<br>    Enter state Error.<br>  endif. (AREG)<br>endif. (current memory cell) |
| Error | cld | Clear numeric, fraction and unit of<br>  measurement field of the current memory<br>  cell.<br>Clear status display.<br>Establish the current memory cell as<br>  empty/unstored.<br>Clear AACC.<br>Clear AREG.<br>Clear NTOK.<br>Clear FLMT.<br>Enter state Numeric. |
|  | other | Ignore entry.<br>Enter state Error. |

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A measurement calculator for storing and calculating measurement data comprising, in combination:

a hollow housing adapted to be coupled to the side of a tape measure;

computer circuitry disposed within and extended from the housing, the computer circuitry further comprising:

central processing unit circuitry adapted for controlling the status of operations of the computer circuitry and manipulating measurement data therein;

read-only-memory circuitry having a plurality of memory cells adapted for storing non-volatile instructions and data for use by the central processing unit circuitry;

random-access-memory circuitry having a plurality of memory cells adapted for storing user-supplied volatile measurement data with a single item of measurement data being logically accessed by a user with a label denoted by a single alphabetic symbol from 'a' through 'z';

gate circuitry coupled to the read-only-memory circuitry and random-access-memory circuitry and adapted for selecting volatile and non-volatile instructions and data therefrom for processing and display;

liquid crystal display circuitry adapted for displaying measurement data and operational status indications, the liquid crystal display circuitry having a display window with a status section and a memory cell content section, the status section displaying error status, arithmetic operation in-progress status, and an indication of fractional processing in-progress status, the memory cell content section displaying a label with the associated numeric measurement data, fractional measurement data, and unit of measure;

driver circuitry coupled between the central processing unit circuitry and liquid crystal display circuitry adapted for converting measurement data and operational status indications to a form compatible for display by the liquid crystal display circuitry;

bus circuitry adapted for transferring computer circuitry instructions and data between the central processing unit circuitry, read-only-memory circuitry, random-access-memory circuitry, gate circuitry, and driver circuitry;

keypad circuitry coupled to the central processing unit circuitry and adapted for receiving user input measurement data and instructions for use, the keypad circuitry having numeric keys adapted for inputting numeric measurement data, fraction keys adapted for inputting fractional measurement data, arithmetic operation keys adapted for performing operations on measurement data, unit-of-measurement keys adapted for converting measurement data having an existing unit of measure to another unit of measure, memory operation keys adapted for controlling memory, processing, and display operations, and scrolling keys adapted for accessing and scrolling through measurement data indexed by the labels;

computer instructions resident in the read-only memory circuitry adapted for operating with the computer circuitry for manipulating the measurement data;

power circuitry for energizing the computer circuitry; and switch means coupled between the power circuitry and computer circuitry and having one orientation for activating the computer circuitry and another orientation for de-activating the computer circuitry.

* * * * *